(12) United States Patent
Fukuda et al.

(10) Patent No.: US 7,350,926 B2
(45) Date of Patent: Apr. 1, 2008

(54) LIGHT SOURCE APPARATUS AND AN IMAGE DISPLAY APPARATUS

(75) Inventors: Mitsuharu Fukuda, Yokosuka (JP);
Tatsuru Kobayashi, Yokosuka (JP);
Atsushi Koide, Yokohama (JP);
Noboru Fujino, Iwai (JP)

(73) Assignee: Victor Company of Japan, Limited, Yokohama, Kanagawa-Ken (JP)

( * ) Notice: Subject to any disclaimer, the term of this patent is extended or adjusted under 35 U.S.C. 154(b) by 322 days.

(21) Appl. No.: 11/154,519

(22) Filed: Jun. 17, 2005

(65) Prior Publication Data
US 2006/0001844 A1    Jan. 5, 2006

(30) Foreign Application Priority Data
Jun. 30, 2004   (JP) ............................ P2004-194094
Dec. 22, 2004   (JP) ............................ P2004-372023

(51) Int. Cl.
G03B 21/16    (2006.01)
G03B 21/18    (2006.01)
G03B 21/26    (2006.01)
H04N 5/74     (2006.01)
G02F 1/1333   (2006.01)
F21V 5/00     (2006.01)
F21V 29/00    (2006.01)
F21V 7/20     (2006.01)

(52) U.S. Cl. ............................ 353/55; 353/60; 353/61; 348/748; 349/161; 362/580; 362/264; 362/294; 362/345; 362/373

(58) Field of Classification Search .................. 353/52, 353/55, 57, 58, 60, 61; 348/748; 349/161; 362/580, 547, 218, 264, 294, 345, 373
See application file for complete search history.

(56) References Cited

U.S. PATENT DOCUMENTS
5,860,719 A  *  1/1999  Suzuki et al. ................. 353/61

FOREIGN PATENT DOCUMENTS
JP      2003-115215        4/2003

* cited by examiner

*Primary Examiner*—Rochelle Blackman
(74) *Attorney, Agent, or Firm*—The Nath Law Group; Jerald L. Meyer; Matthew Moffa

(57) ABSTRACT

A light source apparatus according to one embodiment of the present invention is comprised of a light emitting tube having a first electrode in one end and a second electrode in the other end thereof, the tube having both ends closed, a concave-shaped reflector having a hole in its deepest portion, the hole being provided for holding the light emitting tube, a transparent glass plate covering an opening of the reflector, a lead wire whose ends connects to the second electrode and extends out through a hole formed on a side surface of the reflector, respectively, a cooling fan blowing cooling air toward the reflector, and an air guiding member that separates the cooling air from the fan into a first cooling air cooling an outer surface of the reflector and a second cooling air cooling the other end of the lead wire extending out from the reflector.

2 Claims, 14 Drawing Sheets

LIGHT SOURCE APPARATUS AND AN IMAGE DISPLAY APPARATUS

BACKGROUND OF THE INVENTION

1. Field of the Invention

The present invention relates to a light source apparatus that illuminates light emitted from a light emitting tube upon a predetermined area of a spatial light modulator or the like and can preferably be applied to an image display apparatus or the like. In addition, the present invention relates to an image display apparatus comprised of the same.

2. Description of the Related Art

In an image display apparatus such as a so-called liquid crystal projector device, a small-sized ultra high pressure mercury lamp having a high brightness is employed as a light source to illuminate a liquid crystal panel as a spatial light modulator.

Since the ultra high pressure mercury lamp offers substantially a point source of light, light emitted from the lamp can be efficiently utilized. In addition, the emission spectrum of the light emitted from the ultra high pressure mercury lamp can be continuous by keeping a pressure in the tube of the lamp from 150 atmospheres (atm) to 200 atm. Furthermore, since the ultra high pressure mercury lamp has a high efficiency of converting the energy applied thereto to visible light (a wavelength range from 400 nanometers (nm) to 700 nm), it is preferable as a source of light for use in an image display apparatus such as a liquid crystal projector device.

It is an ultra high pressure mercury lamp of 70 Watts (W) to 280 W class that has been employed in an image display apparatus of projection type.

By the way, a pressure inside a light emitting tube must be held more highly than a predetermined pressure in order to exploit the ultra high pressure mercury lamp to the maximum performance. For this reason, even the coldest spot of the light emitting tube has to be held at a high temperature. On the other hand, the highest temperature of the light emitting tube is equal to a predetermined temperature or less in order to realize a stabilized long-term operation of the lamp. This is because crystallization of a quartz glass constituting the light emitting tube has to be prevented.

In other words, the ultra high pressure mercury lamp has to be appropriately cooled so that the temperature of the light emitting tube falls within a predetermined temperature range.

In order to cool an ultra high pressure mercury lamp in a conventional light source apparatus, two cooling methods are adopted depending on a rating of an ultra high pressure mercury lamp (applied electric power). A first cooling method is adopted in a comparatively small light source apparatus operating mainly at an electric power of 150 W or lower. In such a light source apparatus, the light emitting tube is held in a concave-shaped reflector and the front opening of the concave-shaped reflector is covered with a transparent glass plate. Therefore, the light source apparatus is substantially enclosed. The light emitting tube in the light source apparatus is cooled by blowing air to the entire of the reflector from outside and thus kept at a predetermined temperature.

A second cooling method is adopted in a comparatively large-scale light source apparatus operating mainly at an electric power 150 W or higher. In such a light source apparatus, the light emitting tube is held in a concave-shaped reflector and the front opening of the concave-shaped reflector is covered with a transparent glass plate. The light source apparatus having such a construction has a hole for cooling air to flow therethrough in a side portion of the reflector or in the center of the transparent glass plate. Therefore, the light emitting tube is directly cooled by blowing air to the inside of the reflector through the hole.

Of the two methods—one for cooling the entire of the concave-shaped reflector and the other for cooling directly the light emitting tube—the former can control the temperature of the tube in a more stabilizing way than the latter.

Japanese Patent Laid-Open Publication No. 2003-115215 discloses a light source apparatus configured in a way that the outside portion of a concave-shaped reflector is cooled.

In this light source apparatus, a light emitting tube 101 is installed in a concave-shaped reflector 102 as shown in FIG. 1. One end of the light emitting tube 101 goes through a bore established in the deepest portion of the concave-shaped reflector 102 so as to protrude outward. Also, the end portion is fixedly supported by means of a lamp base 121. The concave-shaped reflector 102 is a concave mirror having an open front side and an inner circumference face thereof serves as a reflection face. The front side of the concave-shaped reflector 102 is closed by means of a transparent glass plate 103.

On the upper outside of the concave-shaped reflector 102, the upper outside being adjacent to the upper part of the light emitting tube 101, a ventilation duct 104 is provided in order to guide cooling air. Cooling air caused by an intake fan (not shown) passes through the ventilation duct 104, to locally cool the upper outside portion of the concave-shaped reflector 102.

By the way, FIGS. 1A and 1B are a plane and a side view of the related-art light source apparatus, respectively.

In this light source apparatus, an upper outer portion of the concave-shaped reflector 102 is cooled and thus an amount of heat radiating from the upper portion of the concave-shaped reflector 102 to the portion that is hottest in the light emitting tube 101 is reduced. In addition, an inner convection caused inside of the concave-shaped reflector 102 increases a heat dissipation from the light emitting tube 101. Therefore the upper portion of the light emitting tube 101 is kept at an appropriate temperature.

In the related-art light source apparatus, an increase in the temperature of the upper portion of the light emitting tube 101 held in the concave-shaped reflector 102 is restricted by locally cooling the upper portion of the concave-shaped reflector 102 as stated above, thereby preventing the quartz glass constituting the light emitting tube 101 from being crystallized or losing its transparency.

However, not only the temperature of the upper portion of a light emitting tube but also the temperature in the sealing portion that seals discharge electrodes in the light emitting tube is important as a factor that determines the service life of an ultra high pressure mercury lamp.

An electrode portion of the light emitting tube is composed of the discharge electrodes essentially consisting of tungsten, a molybdic foil for firmly attaching the discharge electrodes to a bulb made of quartz glass, and an outer terminal. The temperature of a portion in which the molybdic foil meets the quartz glass is a significant factor for determining the life of the ultra high pressure mercury lamp.

On the other hand, when the temperature of the sealing portion that seals the discharge electrodes in the light emitting tube is reduced excessively due to the cooling, the pressure inside of the light emitting tube is accordingly reduced. As a result, luminous flux with a desired intensity cannot be obtained and intensity distribution of the flux is changed, thereby deteriorating a color balance of the image created by the image display apparatus.

On the contrary, when the temperature of the sealing portion is raised excessively due to poor cooling, oxidation of the molybdic foil used in the portion is promoted and thus adhesion between the foil and the quartz glass constituting the light emitting tube is degraded, thereby presumably causing fracture or breakage in the tube.

SUMMARY OF THE INVENTION

The objective of the present invention is to provide a light source apparatus in which its light emitting tube is appropriately cooled, the light source apparatus having a structure in which an opening of a reflector formed into a concave shape is substantially hermetically sealed by a transparent glass plate, and also an image display apparatus utilizing such a light source apparatus.

The present invention has been made in order to eliminate the above disadvantages and accomplish the above objective.

A first aspect of the present invention provides a light source apparatus comprising a light emitting tube having a first electrode in a first end thereof and a second electrode in a second end thereof; a concave-shaped reflector having a bore in a vertex portion thereof, the bore supporting the light emitting tube so that the first end is inserted therethrough and the second end is directed toward a front opening portion of the concave-shaped reflector; a transparent glass plate covering the front opening portion of the concave-shaped reflector; a lead wire of which one end connects to the second electrode and of which the other end extends out through a hole formed on a curved slope or a side surface of the concave-shaped reflector; a cooling fan blowing cooling air toward a side portion of the concave-shaped reflector; and an air guiding member that separates the cooling air originating from the cooling fan into a first, a second, and a third cooling air, the first cooling air cooling an outer surface of the concave-shaped reflector, the second cooling air cooling the other end of the lead wire extending out from the concave-shaped reflector, and the third cooling air cooling the transparent glass plate.

In this light source apparatus, the cooling air blown from the cooling fan is guided as the second cooling air toward the other end side of the lead wire that extends out from the concave-shaped reflector by the air guiding member, thereby cooling the sealing portion that seals discharge electrodes.

A second aspect of the present invention provides a light source apparatus comprising a light emitting tube having a first electrode in a first end thereof and a second electrode in a second end thereof; a concave-shaped reflector having a bore in a vertex portion thereof, the bore supporting the light emitting tube so that the first end is inserted therethrough and the second end is directed toward a front opening portion of the concave-shaped reflector; a transparent glass plate covering the front opening portion of the concave-shaped reflector; and an ultraviolet and infrared reflection filter upon which light is incident, the light having been reflected by the concave-shaped reflector and passing through the transparent glass plate. The reflection filter has an infrared reflecting film on one surface thereof and an ultraviolet reflecting film on the other surface thereof. The reflection filter is disposed so that the surface having the infrared reflecting film thereon faces toward the transparent glass plate.

In this light source apparatus, since the ultraviolet and infrared reflection filter is disposed in a way that its surface having the infrared reflecting film faces toward the transparent glass plate, ultraviolet light that is emitted from the light emitting tube and reflected by the ultraviolet reflecting film to return to the light emitting tube passes twice through a glass base material constituting the ultraviolet and infrared reflection filter and thereby the ultraviolet light is absorbed. Therefore, an amount of the ultraviolet light to be returned to the light emitting tube is reduced.

The ultraviolet and infrared reflection filter (UV/IR cut filter) is a filter that has an ultraviolet reflecting film on one surface of a glass base material (plate glass) and an infrared reflecting film on the other surface of the material.

A third aspect of the present invention provides an image display device comprising any light source apparatus according to the first or the second aspect, image display device comprising a light source apparatus according to claim 1; a spatial light modulator device adopted to modulate light illuminated thereon; and an imaging optics adopted to guide the light modulated by said spatial light modulator device so as to focus into an image.

In this image display apparatus, the light source apparatus is appropriately cooled, thereby displaying a highly bright image having a splendid color balance.

In the light source apparatus according to the present invention, since the light emitting tube is held in the concave-shaped reflector and the opening of the concave-shaped reflector is covered with the transparent glass plate, the light source apparatus is configured into substantially an enclosed structure.

In the light source apparatus according to the present invention, since the ultraviolet and infrared reflection filter is disposed in away that one surface having the infrared reflecting film faces toward the transparent glass plate, ultraviolet light emitted from the light emitting tube and reflected by the ultraviolet reflecting film to return toward the light emitting tube passes twice through the glass base material of the ultraviolet and infrared reflection filter and thus is absorbed by the glass base material. Therefore, an amount of ultraviolet light that returns toward the light emitting tube is reduced.

Also in the image display apparatus according to the present invention, the light source apparatus is appropriately cooled, thereby displaying highly bright image with a splendid color balance.

In summary, the present invention is to provide a light source apparatus in which a light emitting tube is appropriately cooled while the light source apparatus is configured into a closed structure in which the opening of a concave-shaped reflector is covered with the transparent glass plate.

Also, the present invention is to provide an image display apparatus using such a light source apparatus.

DESCRIPTION OF THE PREFERRED EMBODIMENTS

Referring to accompanying drawings, preferred embodiments according to the present invention will be described in detail hereinafter.

A First Embodiment

Figure 1A:
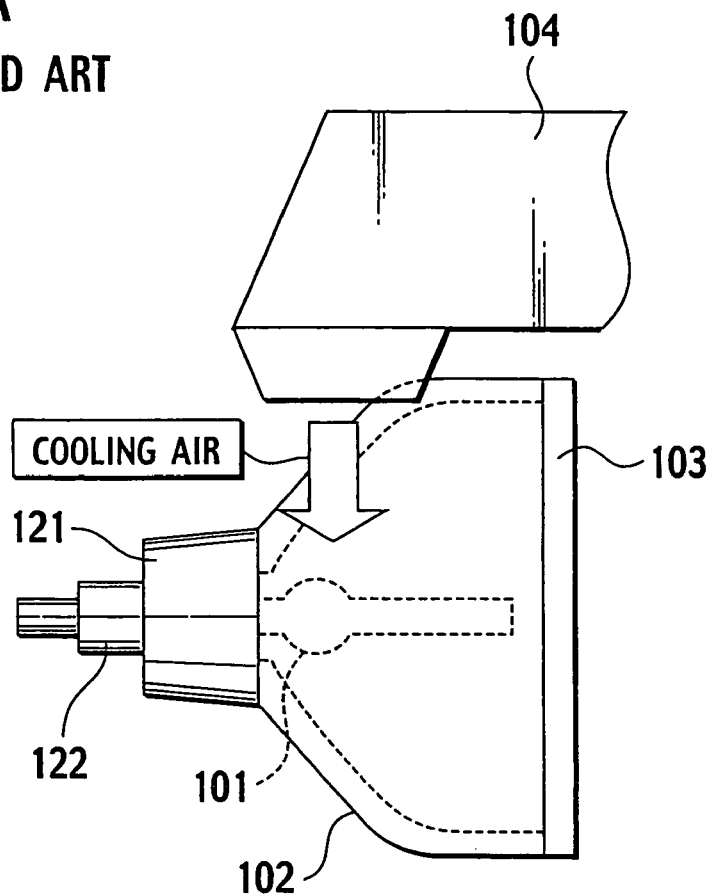
FIGS. 1A and 1B are a plane view and a side view, respectively, illustrating a related art light source apparatus.
Figure 1B:
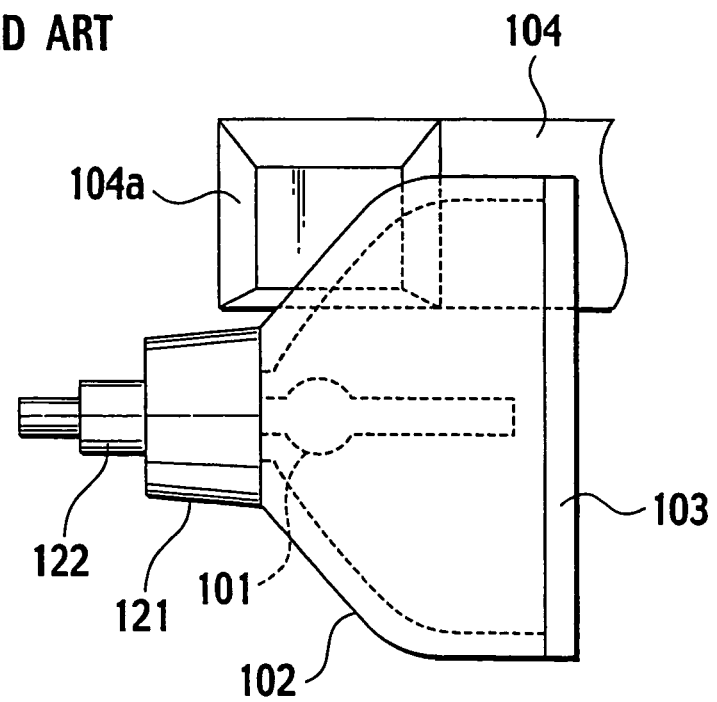
Figure 2:
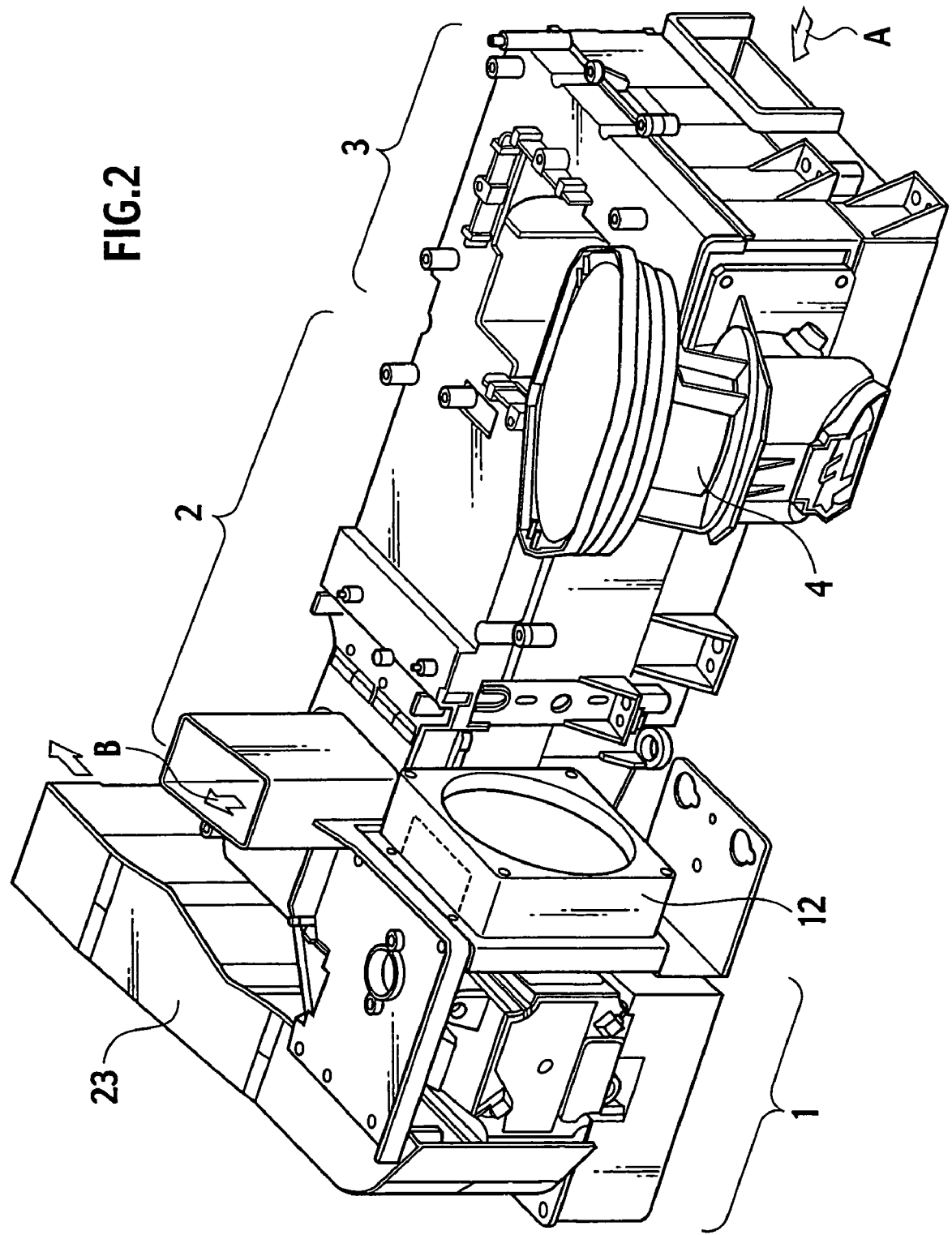
FIG. 2 is a perspective view illustrating an optical system block of an image display apparatus comprised of a light source apparatus according to the present invention.

FIG. 2 is a perspective view illustrating an optical system block of an image display apparatus comprised of a light source apparatus according to the present invention.

As shown in FIG. 2, the optical system block of the image display apparatus configured by using the light source apparatus according to the present invention is composed of a light source unit 1 housing the light source apparatus according to the present invention, an integrator optical system 2 that uniformizes the illumination intensity of light emitted from the light source unit 1, a light modulating section 3, and a projection optical system 4 that serves as an imaging optics. Each unit, system or unit above, which is part of the optical system block, is housed in a body so as to compose the light source apparatus.

Figure 3:
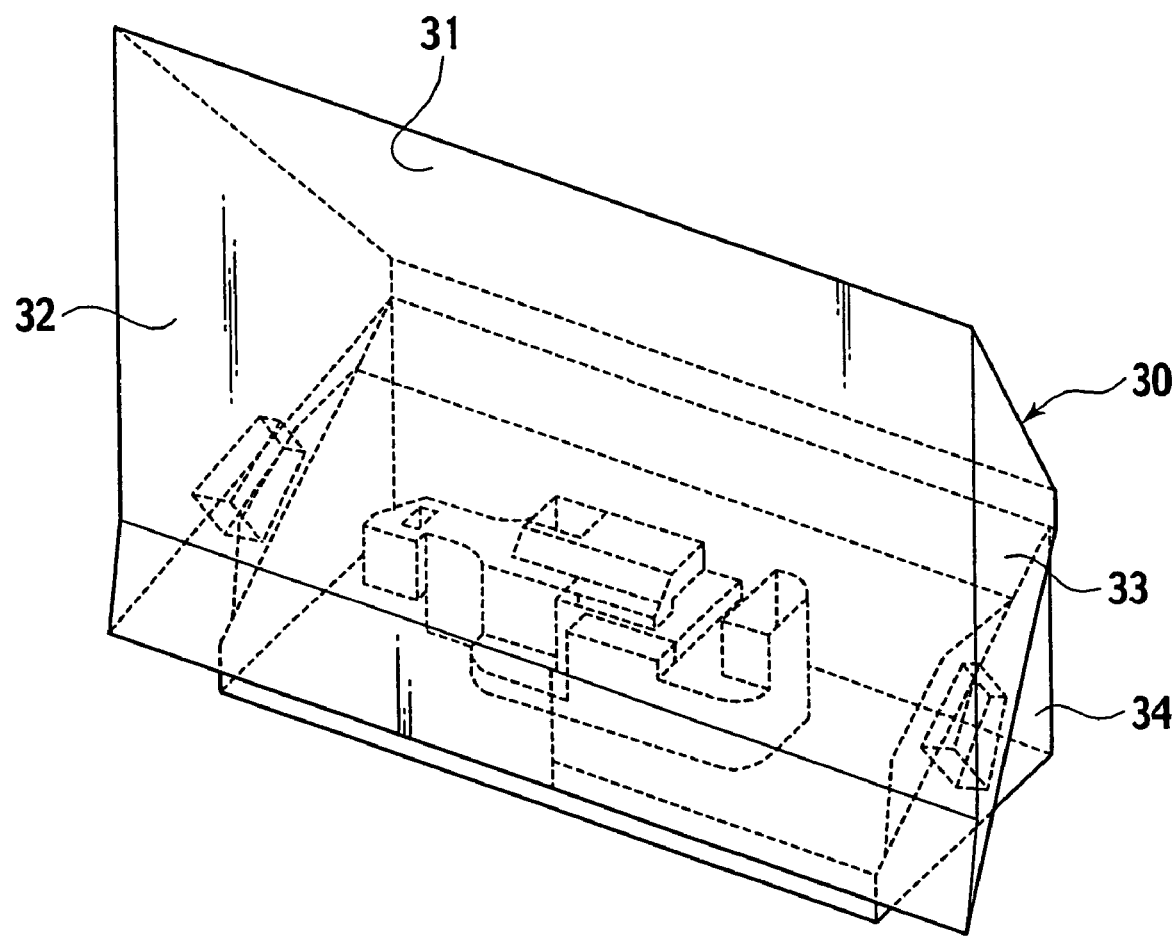
FIG. 3 is a schematic perspective view illustrating an image display apparatus comprised of the optical system block.

FIG. 3 is a schematic perspective view illustrating an image display apparatus comprised of the optical system block.

As shown in FIG. 3, the optical system block is provided in a lower portion of an outer chassis 30. In the optical system block, the light modulation section 3 spatially modulates, by the aid of a spatial light modulator in accordance with image information, the illumination light that originates from the illumination light source unit 1 and then reaches the section 3 by way of the integrator optical system 2. The modulated illumination light is projected obliquely upward by the projection optical system 4. In the image display apparatus, the illumination light projected by the projection optical system 4 is reflected by a mirror 31 provided in the outer chassis 30 and projected toward a semi-transparent screen 32 that constitutes a front portion of the image display apparatus from behind the screen 32. The illumination light projected onto the semi-transparent screen 32 in the above manner creates image on the screen 32.

In the outer chassis 30 of the image display apparatus, there is a partition wall that partitions an upper space in which the mirror 31 and the semi-transparent screen 32 are disposed and a lower space 34 in which the optical system block is provided. The upper space 33 is substantially encapsulated in order to prevent light from entering therein or leaking therefrom and dust from coming in.

In addition, in the optical system block, a body that houses the integrator optical system 2, the light modulating section 3 and the projection optical system 4 is in communication with the upper space 33 of the outer chassis 30 via a plurality of ducts. On the other hand, in the optical system block, a body that houses the illumination light source unit 1 is in communication with the lower space 34 via a plurality of ducts. However, in the optical system block, the body that houses the illumination light source unit 1 is separated from the body that houses the integrator optical system 2, the light modulating section 3 and the projection optical system 4 in a way that no air comes to and fro between these two bodies.

The illumination light source unit 1 is cooled by the air that is taken in by an axial fan 12 which serves as a cooling fan to the lower space 34 of the outer chassis 30 from outside. The cooling air that is fanned in to the inside of the illumination light source unit 1 by the axial fan 12 and used to cool the illumination light source unit 1 is then discharged outside of the outer chassis 30 via a duct 23.

An amount of heat given out in the illumination light source unit 1 is largest in the optical system block. Therefore, the cooling air has to be taken in from outside via a dust filter and then discharged to outside after cooling the illumination light source unit 1 in a way that the air heated by the unit 1 hardly causes a thermal influence on other optical systems.

On the other hand, the integrator optical system 2, the light modulating section 3, and the projection optical system 4 are cooled by air circulation in the upper space 33 of the outer chassis of the image display apparatus. In other words, air in the upper space 33 of the outer chassis 30 is blown into the body of the optical system block via the duct so as to cool the integrator optical system 2, the light modulating section 3, and the projection optical system 4, as shown by an arrow A in FIG. 2. The air that has cooled the integrator optical system 2, the light modulating section 3, and the projection optical system 4 is discharged form the body of the optical system block and returned to the upper space 33 of the outer chassis 30 via the duct, as shown by an arrow B in FIG. 2. The air inside of the upper space 33 is to circulate around the upper space 33 and the body that houses the integrator optical system 2, the light modulating section 3, and the projection optical system 4.

The integrator optical system 2, the light modulating section 3, and the projection optical system 4, except for the illumination light source unit 1, are mainly heated as a result that a transparent optical member of the systems or section absorbs the light originating from the illumination light source 1. Therefore, sufficient cooling is realized by the air circulating around in the upper space 33 of the outer chassis 30 that is substantially enclosed. In addition, the upper side 33 of the outer chassis 30 is substantially encapsulated so that dust in the air is prevented from coming in thereby prolonging the service life of the optical system block.

Figure 4:
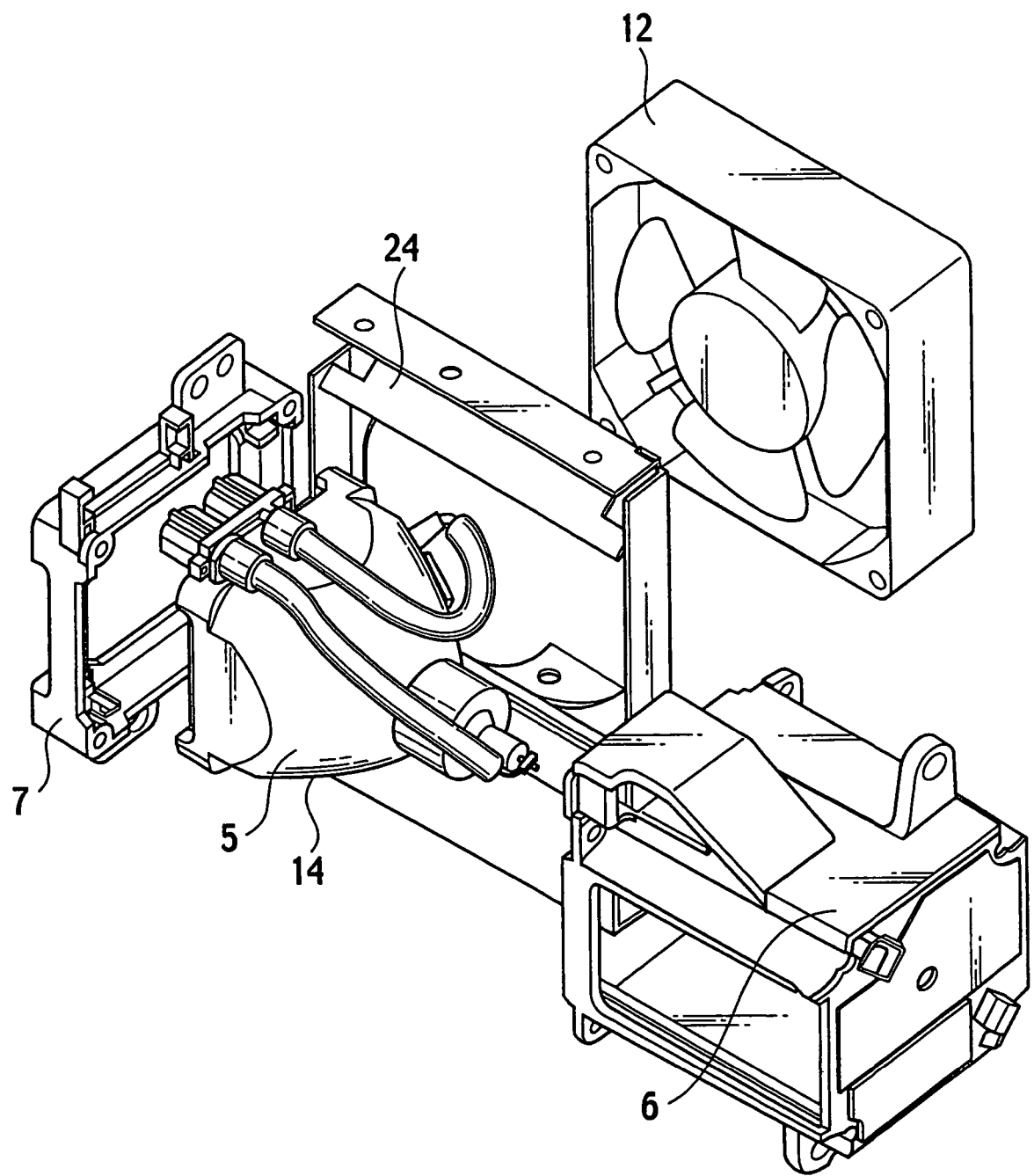
FIG. 4 is an exploded perspective view illustrating an illumination light source unit of the light source apparatus.

FIG. 4 is an exploded perspective view illustrating an illumination light source unit of the light source apparatus.

The illumination light source unit 1 includes an ultra high pressure mercury lamp unit 5, as shown in FIG. 4. The ultra high pressure lamp unit 5 is configured to have an ultra high pressure mercury lamp as a light emitting tube and a concave-shaped reflector 14 that holds the ultra high pressure lamp. The ultra high pressure mercury lamp unit 5 is inserted into a cylinder-shaped lamp housing 6 serving as a casing and secured therein by aid of a holding bracket 7.

In the ultra high pressure mercury lamp unit 5, the luminous point of the light emitting tube lies inside of the concave-shaped reflector 14 in a way that the light emitted from the luminous point is reflected by a concave-shaped reflecting face, that is, the inner face of the concave-shaped reflector 14 and thus projected forward. A light axis of the flux of the light projected in such a manner is substantially horizontal.

By the way, the ultra high pressure mercury lamp unit 5 is usually treated as an individual part housed in the lamp housing 6 and lamp replacement or the like is performed while the lamp unit 5 is housed in the lamp housing 6.

In the illumination light source unit 1, the cooling air is blown from a side of the lamp housing 6 to a side face portion of the ultra high pressure mercury lamp unit 5 by the axial fan 12 as a cooling fan.

Between the lamp housing 6 and the axial fan 12, there is disposed a wind deflector 24 that serves as a wind guiding member, the deflector 24 being secured on the holding bracket 7. Since the wind deflector 24 guides the cooling air from the axial fan 12, the cooling air is introduced efficiently into the lamp housing 6 through a cooling air inlet provided therein.

By the way, when it is impossible to arrange the axial fan 12 near the illumination light source unit 1, the fan 12 can be arranged away from the illumination light source unit 1 under the condition that a wind path extending from the axial fan 12 to the illumination light source 1 is assured in a way that the illumination light source unit 1 is efficiently cooled.

Figure 5A:
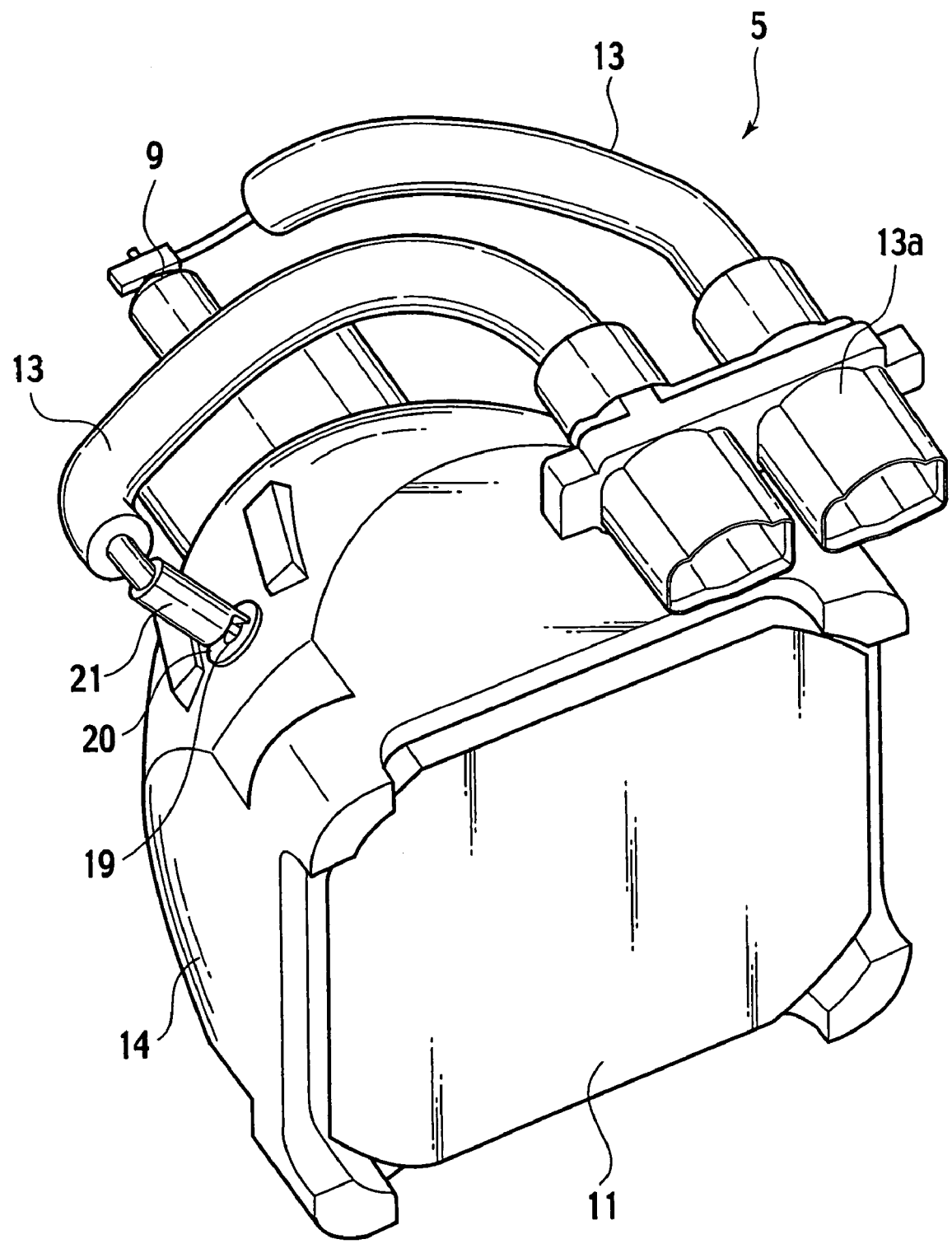
FIG. 5A is a perspective view illustrating a structure of an ultra high pressure mercury lamp of the light source apparatus.

FIG. 5A is a perspective view of the ultra high pressure mercury lamp unit 5.

The ultra high pressure mercury lamp unit 5 has the reflector 14 having a concave shape such as but not limited to an ellipsoid or a paraboloid of revolution. The reflector 14 has a cold mirror coating formed on the inner face thereof, the coating being able to let infrared light pass therethrough, as shown in FIG. 5A. The ultra high pressure mercury lamp unit 1 also has the light emitting tube with both ends closed in the deepest portion thereof. The front portion of the concave-shaped reflector 14 is formed as an open light projecting portion. The light projecting portion is closed with a transparent glass plate 11. In the ultra high pressure mercury lamp unit 5, there has been created substantially an enclosed structure with the concave shaped reflector 14 and the transparent glass plate 11.

A first electrode 9 of the light emitting tube extends out of the concave-shaped reflector 14 along the rear direction through an opening provided in the deepest portion thereof.

Figure 5B:
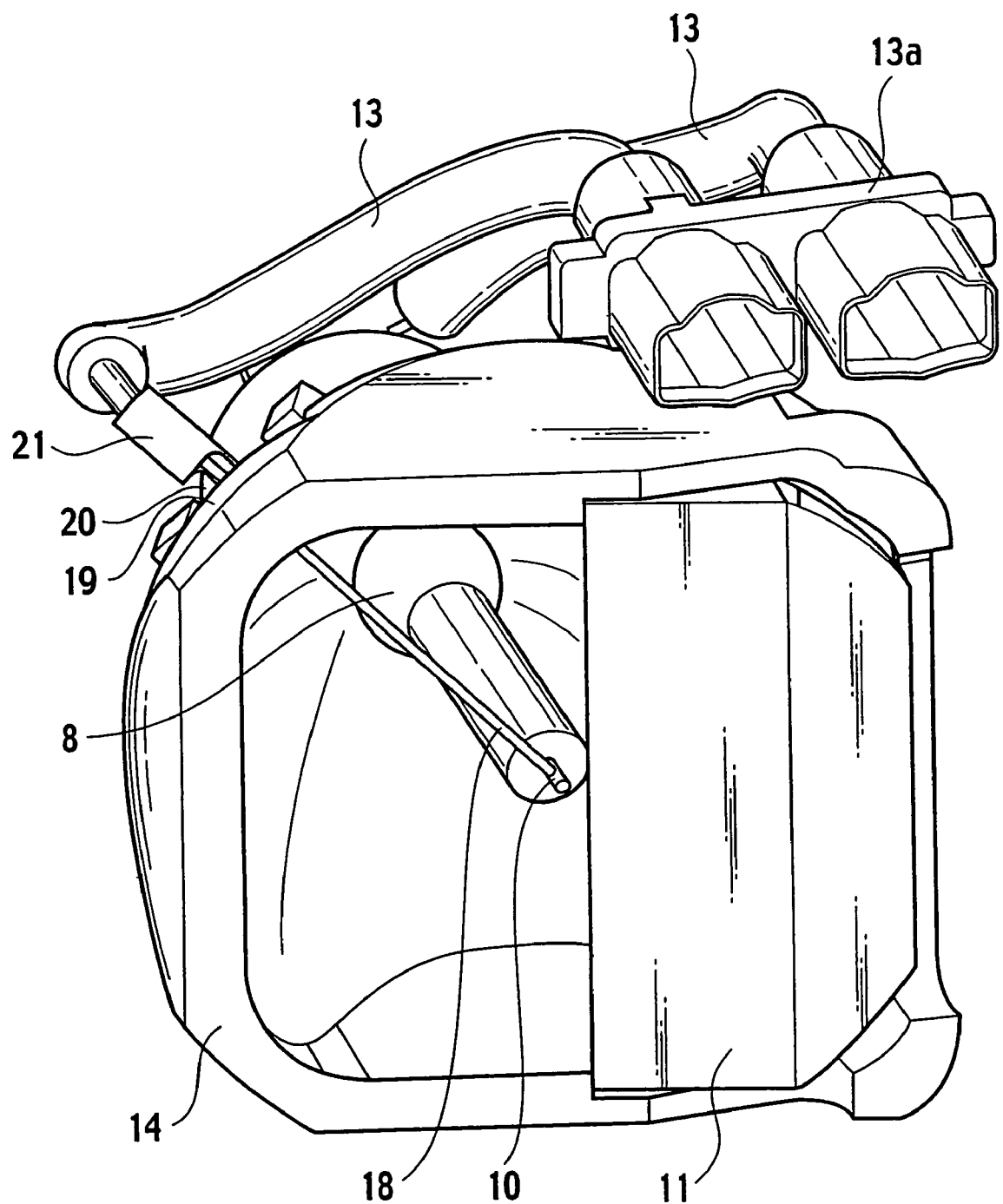
FIG. 5B is a partially exploded perspective view illustrating an inner structure of the ultra high pressure mercury lamp of the light source apparatus.

FIG. 5B is a partially exploded perspective view illustrating an inner structure of the ultra high pressure mercury lamp of the light source apparatus.

One end of a lead wire 18 is connected to a second electrode 10. The other end of the lead wire 18 is taken out from the concave-shaped reflector 14 through a hole provided on a curved round face or a side of the reflector 14. The other end of the lead wire 18 is taken out preferably in an obliquely upward direction with respect to the light axis of the illumination light projected from the concave-shaped reflector 14.

The first electrode 9 and the other end of the lead wire 18 are connected to connectors 13a via an electrically conductive wire 13, 13, respectively. The connectors 13a are fixated on the lamp housing 6. The connectors 13a are to be electrically connected to a light emitting tube power supply (not shown) when the illumination light source unit 1 is installed in the optical system block.

Figure 6:
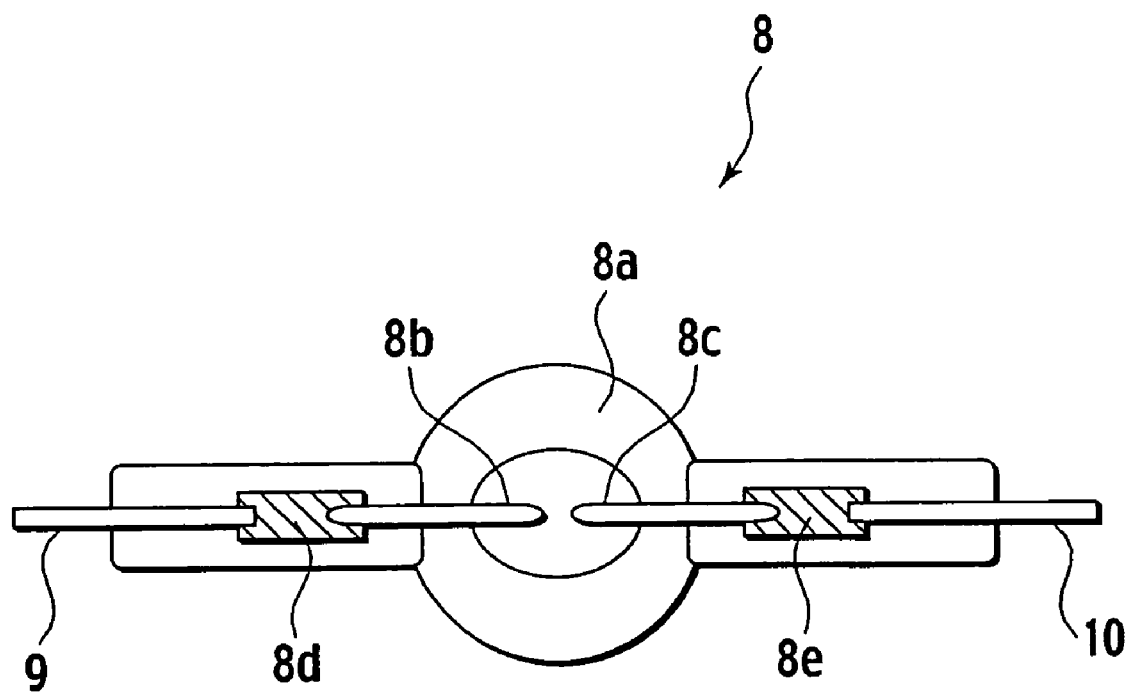
FIG. 6 is a side view illustrating a light emitting tube used in the light source apparatus.

FIG. 6 is a side view illustrating a structure of the light emitting tube.

As shown in FIG. 6, the light emitting tube 8 with both ends closed is constructed basically with a bulb 8a containing mercury, argon and a slight amount of halogen gas therein, the bulb 8a being typically made of quartz glass. The center portion of the bulb 8a is a luminous point. In the bulb 8a, there are arranged discharge electrodes 8b and 8c with their tip being opposed with each other leaving a distance of 1 mm to 1.5 mm therebetween. The base portion of the discharge electrodes 8b and 8c is connected to molybdic foils 8d and 8e, to which leading electrodes 9 and 10 are thus connected. The leading electrodes 9 and 10 extend respectively toward each end of the bulb 8a and even to outside thereof. A portion of the molybdic foils 8d and 8e seals the bulb 8a made of quartz glass.

Figure 7:
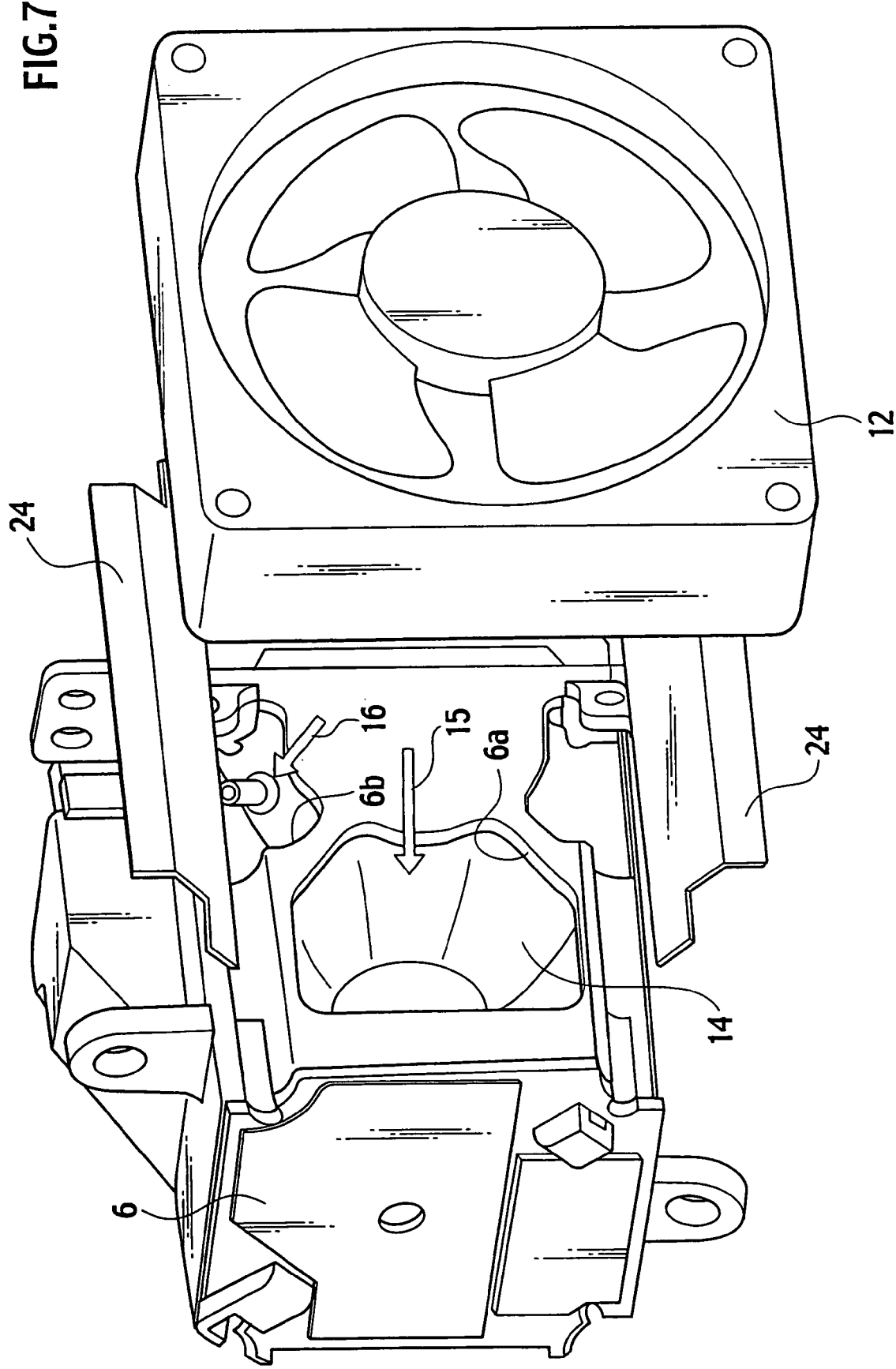
FIG. 7 is an exploded perspective view of the illumination light source apparatus of the light source apparatus, being seen in a direction from an axial fan to the light source apparatus.

FIG. 7 is an exploded perspective view of the illumination light source apparatus of the light source apparatus, being seen in a direction from an axial fan to the light source apparatus.

In the side face portion of the lamp housing 6 enclosing the ultra high pressure mercury lamp unit 5, an opening 6a through which a first cooling air 15 caused by the axial fan 12 is introduced so as to cool the concave-shaped reflector 14, and an opening 6b through which a second cooling air caused by the axial fan 12 is introduced so as to cool an area including the other end of the lead wire 18.

By the way, an area of the side face portion of the lamp housing 6 is closed, the area opposing the motor that lies in the center of the axial fan 12. Since an amount of air coming from the center portion of the axial fan 12 is relatively low and also this area is closed, the first and the second cooling air 15 and 16 are intensively introduced to the reflector 14 and the area including the other end of the lead wire 18 through the openings 6a and 6b positioned around the closed area that opposes the center portion of the axial fan 12.

Figure 8A:
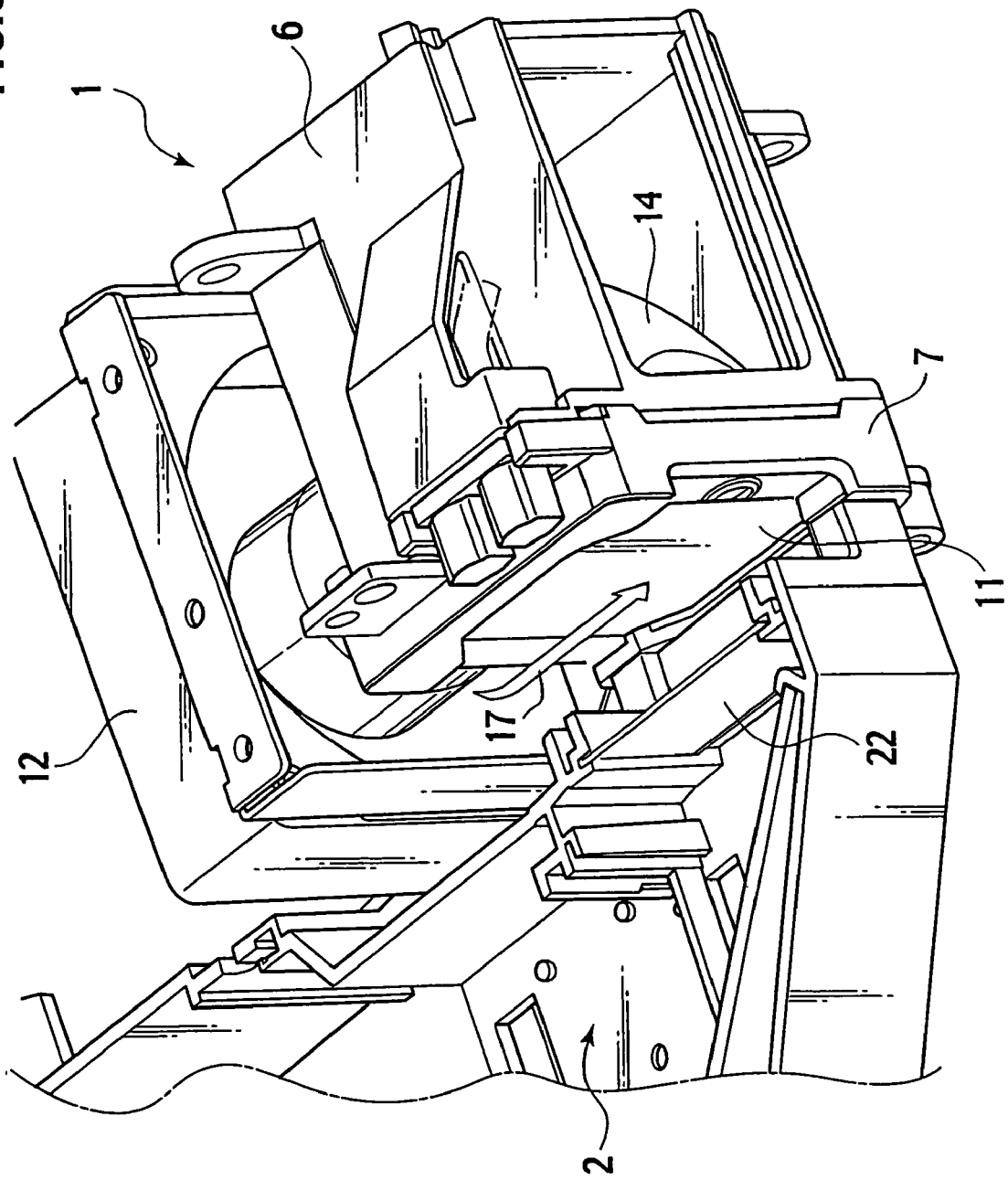
FIG. 8A is a perspective view illustrating a peripheral structure of the illustration light source unit of the light source apparatus.

FIG. 8A is a perspective view illustrating a peripheral portion of the illumination light source unit 1.

Figure 8B:
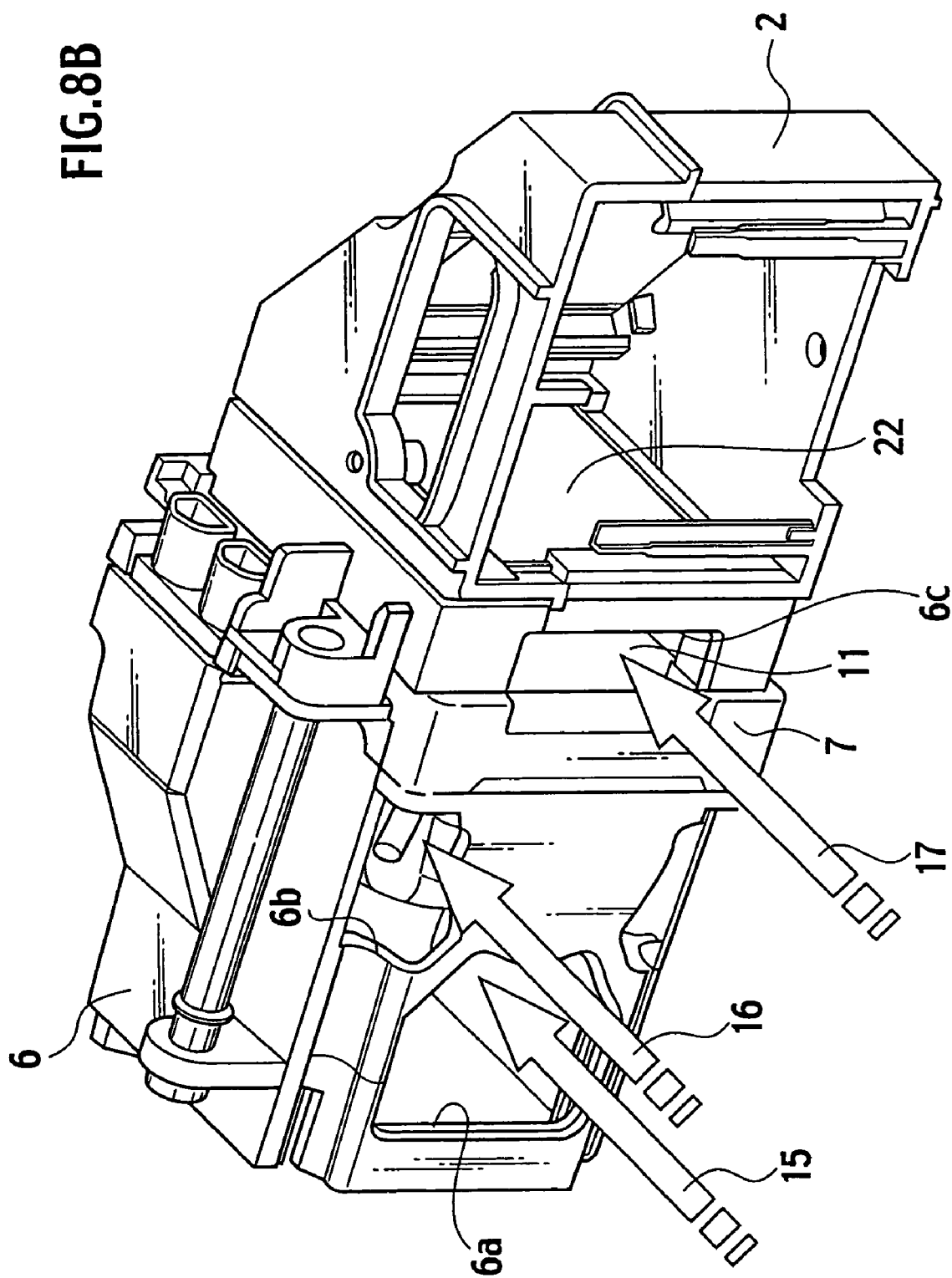
FIG. 8B is a perspective view illustrating a peripheral structure of the illustration light source unit of the light source apparatus, seen from a different direction than that shown in FIG. 8.

FIG. 8B is a perspective view illustrating a peripheral portion of the illumination light source unit 1 seen from a different direction than in FIG. 8A.

Between the holding bracket 7 and the body that houses the integrator optical system 2, there is provided an opening 6c through which a third cooling air 17 caused by the axial fan 12 is introduced as shown in FIGS. 8A and 8B. The third cooling air 17 is to cool a transparent glass plate 11 that serves as a cover for the opening of the concave-shaped reflector 14. The opening 6c is formed by eliminating a part of an abutting area in which the holding bracket 7 meets the body that houses the integrator optical system 2. The third cooling air 17 flows into between the transparent glass plate 11 and an ultraviolet and infrared reflection filter (UV/IR cut filter) 22 so as to cool not only the transparent glass plate 11 but also the filter 22.

By the way, there is provided an open air-path between the axial fan 12 and the illumination light source unit 1 in this embodiment.

Therefore, part of cooling air caused by the axial fan 12 leaks out from between the axial fan 12 and the illumination light source unit 1, thereby cooling an outer side portion of the lamp housing 6 and the holding bracket 7.

Figure 9:
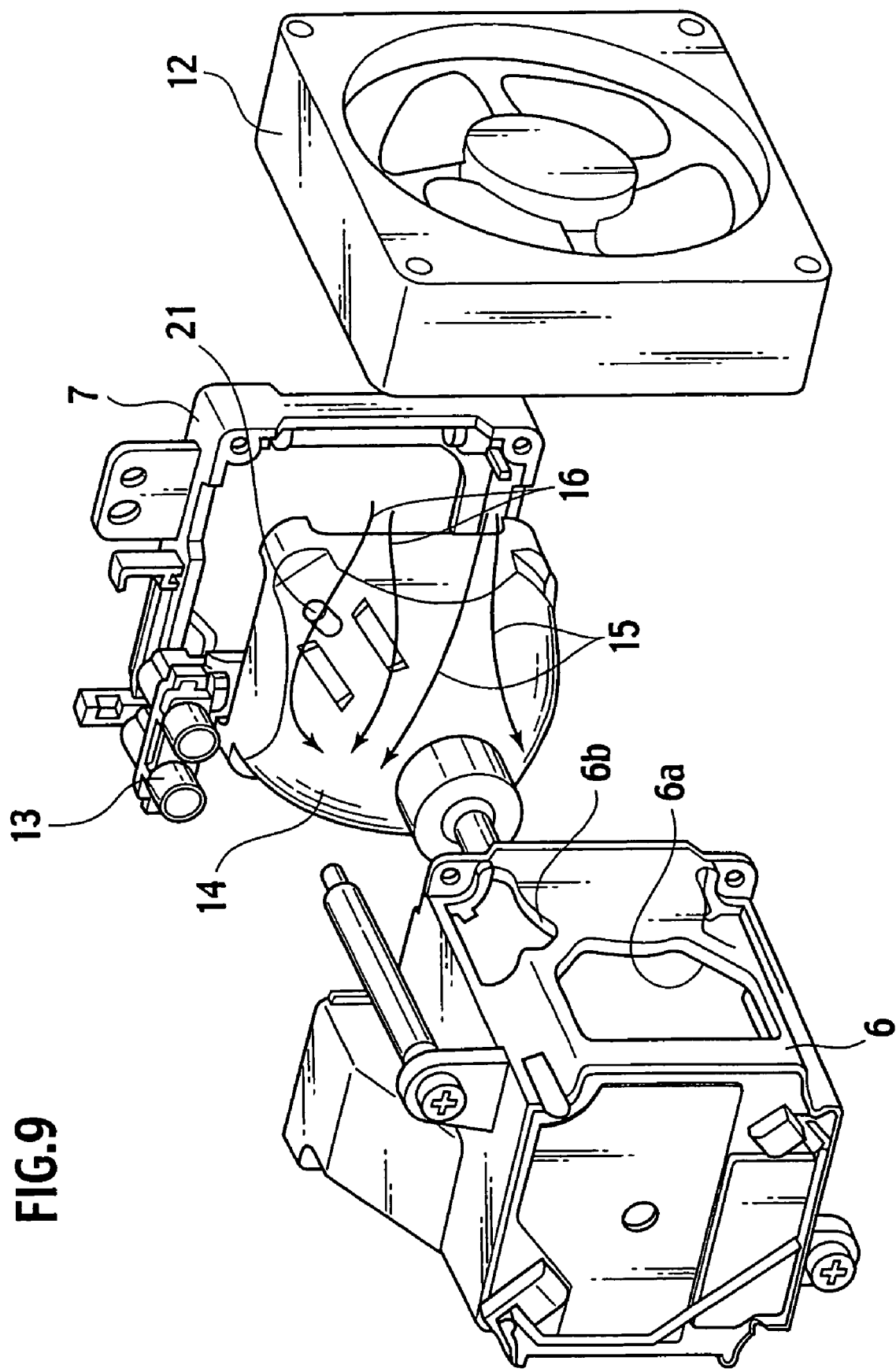
FIG. 9 illustrates a flow direction of cooling air introduced toward a peripheral area of the concave-shaped reflector in the light source apparatus.

FIG. 9 is a perspective view illustrating the flow direction of the cooling air blown toward the concave-shaped reflector 14.

In the illumination light source unit 1, the first and the second cooling air 15, 16 are introduced to a peripheral portion of the concave-shaped reflector 14. The second cooling air 16 is able to intensively cool a caulking member 21 as well as the other end of the lead wire 18 because the other end of the lead wire 18 is taken out obliquely upward with respect to the light axis of the illumination light and thus caulked with the caulking member 21. After cooling the caulking member 21, the second cooling air 16 continues to flow so as to cool an upper portion of the concave-shaped reflector 14, namely, a highly heated portion. Thus, an efficient cooling is realized in the illumination light source unit 1.

In the illumination optical unit 1, a temperature in each portion of the light emitting tube 8 that operates with electric power of for example 110 watts has to be restricted as follows:

(1) a temperature in the upper portion of the light emitting tube 8: 980 to 1050 degrees Celsius.
(2) a temperature in the lower portion of the light emitting tube 8: 840 degrees Celsius or higher.
(3) a temperature in the sealing portion: 355 degrees Celsius or lower.

Among these temperature ranges, the temperature range shown in (1) for the upper portion of the light emitting tube 8 is determined in order to prevent the quartz glass constituting the bulb 8a of the light emitting tube 8 from crystallizing. If the light emitting tube is used at a higher temperature than the above temperature range, a rapid crystallization of quartz glass takes place and accordingly the crystallized portion of the quartz glass turns to white. Such white quartz glass makes it difficult to let the light emitted from the luminous point pass therethrough, which in turn increases a temperature of the tube. As a result, reliability of the light emitting tube is deteriorated.

The temperature range shown in (2) for the lower portion of the light emitting tube 8 is determined in order to retain a desired pressure in the light emitting tube 8 and thus obtain luminous flux with a desired intensity. However, the temperature thereof is almost dependently determined when the temperature of the upper portion of the light emitting tube 8 is controlled to fall within the temperature range shown in (1) above, which suggests that much attention have not to be paid to the temperature of the lower portion.

The temperature range shown in (3) above is determined for a portion having lowest temperature in the light emitting tube 8 (the lowest temperature portion). There are two sealing portions of the light emitting tube 8, that is, one in the first electrode 9 side and the other in the second electrode 10 side. Since the sealing portion in the first electrode 9 side lies in the rear side of the concave-shaped reflector 14, the portion can be cooled easily. However, the sealing portion in the first electrode 9 side has to be paid attention so as not to be cooled enough. On the other hand, the second electrode 10 lies in the concave-shaped reflector 14 and thus exposed to luminous flux. In other words, the portion in and around the second electrode 10 is configured in a way that heat only can escape with difficulty. Therefore, the portion has to be paid attention to so as not to be hotter than a prescribed temperature.

In the illumination light source unit 1, the sealing portion in the second electrode 10 side is in thermal communication with the outer face of the concave-shaped reflector 14. This is because this portion is connected to one end of the lead wire 18 via a tip portion of the second electrode 10 and the other end of the lead wire 18 is taken out to reach the outer face of the reflector 14. By the way, the second electrode 10 and the lead wire 18 are connected with each other by caulking or the like.

In the illumination light source unit 1, the caulking member 21 to which the other end of the lead wire 18 is caulked, the other end being taken out to the outer face of the concave-shaped reflector 14, is effectively cooled by the second cooling air and thus the sealing portion in the second electrode 10 side can be kept at a predetermined temperature or below.

Assuming that the ambient temperature is about 35 degrees Celsius and a velocity of the second cooling air is set as 2.5 m/sec, a temperature of each portion of the light emitting tube 8 is as follows:

(1) a temperature of the upper portion of the light emitting tube 8: 1,030 degrees Celsius
(2) a temperature of the lower portion of the light emitting tube 8: 880 degrees Celsius
(3) a temperature of the first sealing portion (in the first electrode 9 side): 354 degrees Celsius
(4) a temperature of the second sealing portion (in the second electrode 10 side): 348 degrees Celsius Second Embodiment In a light source apparatus according to the present invention, a second electrode 10 of a light emitting tube 8 extends out from a concave-shaped reflector 14 and connected with a lead wire 18 of which one end is caulked, as shown in FIG. 5B. The lead wire 18 is pulled outward from the concave-shaped reflector 14 through a hole 19 provided on a curved round face or a side of the reflector 14. Furthermore, the end of the lead wire 18, which is pulled outward from the concave-shaped reflector 14, is secured with a caulking member 21 by the aid of a grommet 20 and a conductive wire 13 is caulked with the caulking member 21.

Heat in a second sealing portion of the light emitting tube 8 (in the second electrode 10 side) dissipates out from the concave-shaped reflector 14 only by thermal radiation, convection taking place in the concave-shaped reflector 14, and conduction through the lead wire 18 since the light emitting tube 8 is held in the substantially enclosed reflector 14 of concave shape.

The heat dissipation due to conduction through the lead wire 18 is most easily controlled from outside.

In this embodiment, a change in the cooling effect has been investigated by changing the size of the caulking member 21.

A temperature of the sealing portion of the light emitting tubes 8 each having the caulking member 21 of the following dimension has been measured under an assumption that a velocity of the second cooling air is 2.5 m/sec.

(1) a cylinder-shaped caulking member 21 having an outer diameter of 4 mm and a length of 8 mm, formed by winding a plate member of 0.5 mm thick
(2) a cylinder-shaped caulking member 21 having an outer diameter of 5 mm and a length of 12 mm, formed by winding a plate member of 0.6 mm thick into the shape
(3) a cylinder-shaped caulking member 21 having an outer diameter of 6 mm and a length of 15 mm, formed by winding a plate member of 0.6 mm thick into the shape Among these, assuming that a temperature is T degree(s) Celsius in the sealing portion of the light emitting tube 8 having the caulking member of (1), temperatures are T-4 and T-5 degree Celsius in case of the caulking member of (2) and (3), respectively.

It is understood from the above results that a cooling effect is not so improved in case of (3) taking into a consideration that a surface area of the caulking member 21 that is exposed to the second cooling air 16 (or a heat capacity of the caulking member 21) is in a ratio of 3:6:9 in the caulking members of (1), (2), and (3), respectively. In order to further reduce the temperature of the sealing portion of the light emitting tube 8, a thermal conductivity of the lead wire 18 needs to be raised by changing materials for the lead wire 18 or a diameter thereof.

By the way, it is not preferable that the caulking member 21 has a too large dimension, because a large caulking member 21 may hinder the flow of the second cooling air 16. If the flow of the second cooling air 16 is hindered, the cooling effect exerted on the upper portion of the concave-shaped reflector 14 by the second cooling air 16 after cooling the caulking-member 21 is deteriorated.

However, the caulking member 21 has to be larger as long as the cooling air 16 is not hindered, in order to improve heat-dissipation efficiency.

Figure 10A:
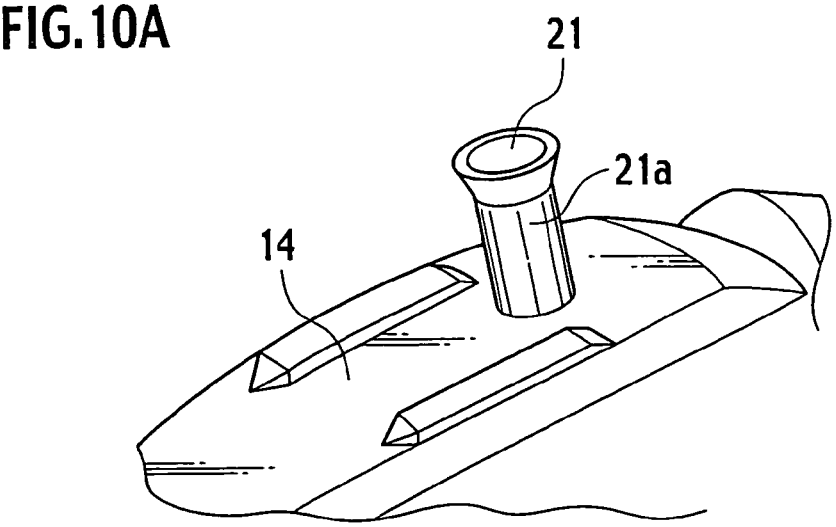
FIGS. 10A to 10C are a perspective view illustrating an example of a structure suitable for enlarging a caulking member in the light source apparatus.
Figure 10B:
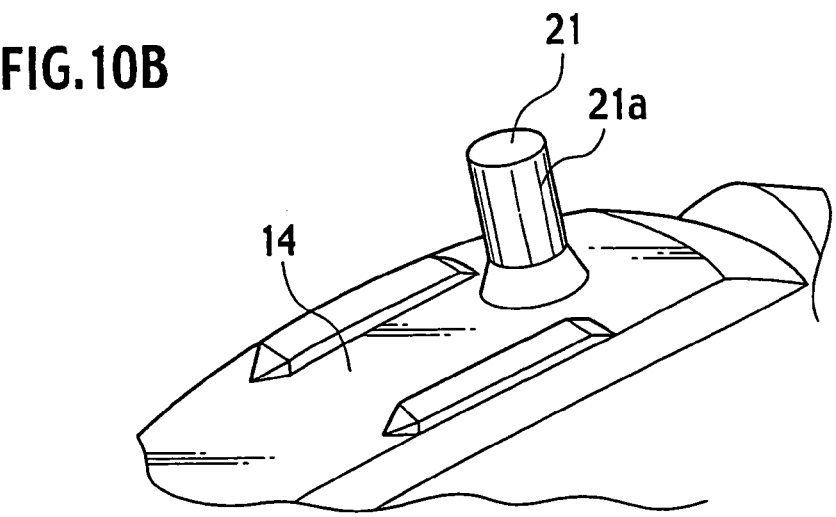
Figure 10C:
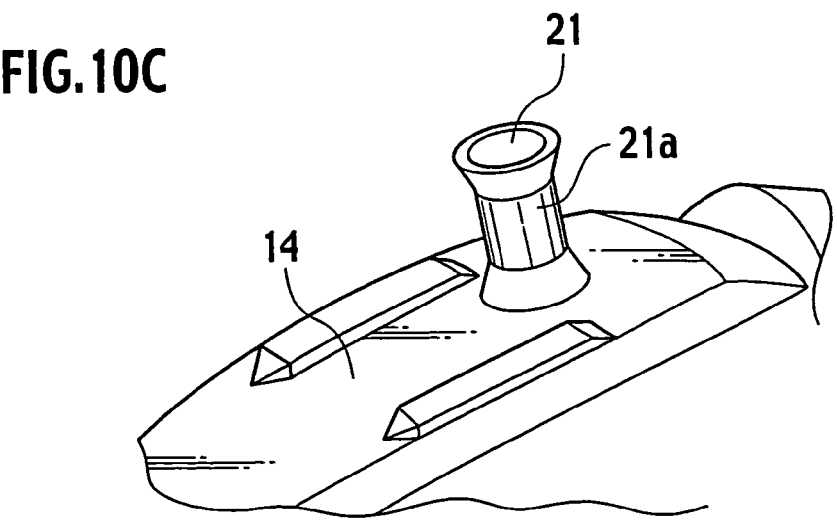

FIGS. 10A to 10C illustrate a perspective view of another structure suitable to enlarge the caulking member 21.

The caulking member 21 can be enlarged by winding a metal plate 21a or the like around the caulking member 21 so as to become cylinder-shaped, as shown in FIGS. 10A through 10C. In this case, the cooling air 16 can hit more effectively the cylinder-shaped caulking member when the member has an expanded diameter in one end, in the other end, or in both ends as shown in FIGS. 10A to 10C, respectively.

Figure 11:
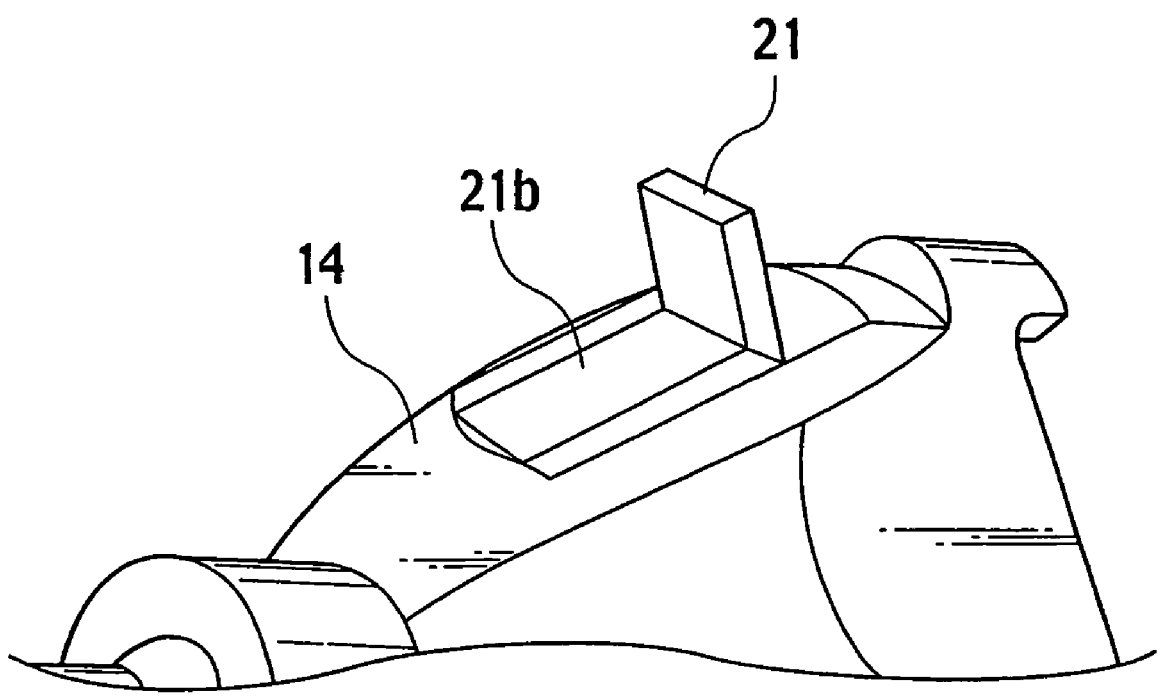
FIG. 11 is a perspective view illustrating a caulking member having another shape in the light source apparatus.

FIG. 11 is a perspective view of another shape of the caulking member 21.

The caulking member 21 can have a shape that receives the second cooling air 16 more effectively. For example, the caulking member 21 can receive a more amount of the cooling air 16 when the caulking member 21 is made into a flat plate than when made into a cylinder. Also in this case, the caulking member 21 can be provided continuously with a heat sink member 21a.

(Explanation of an Ultraviolet and Infrared Reflection Filter)

Figure 12:
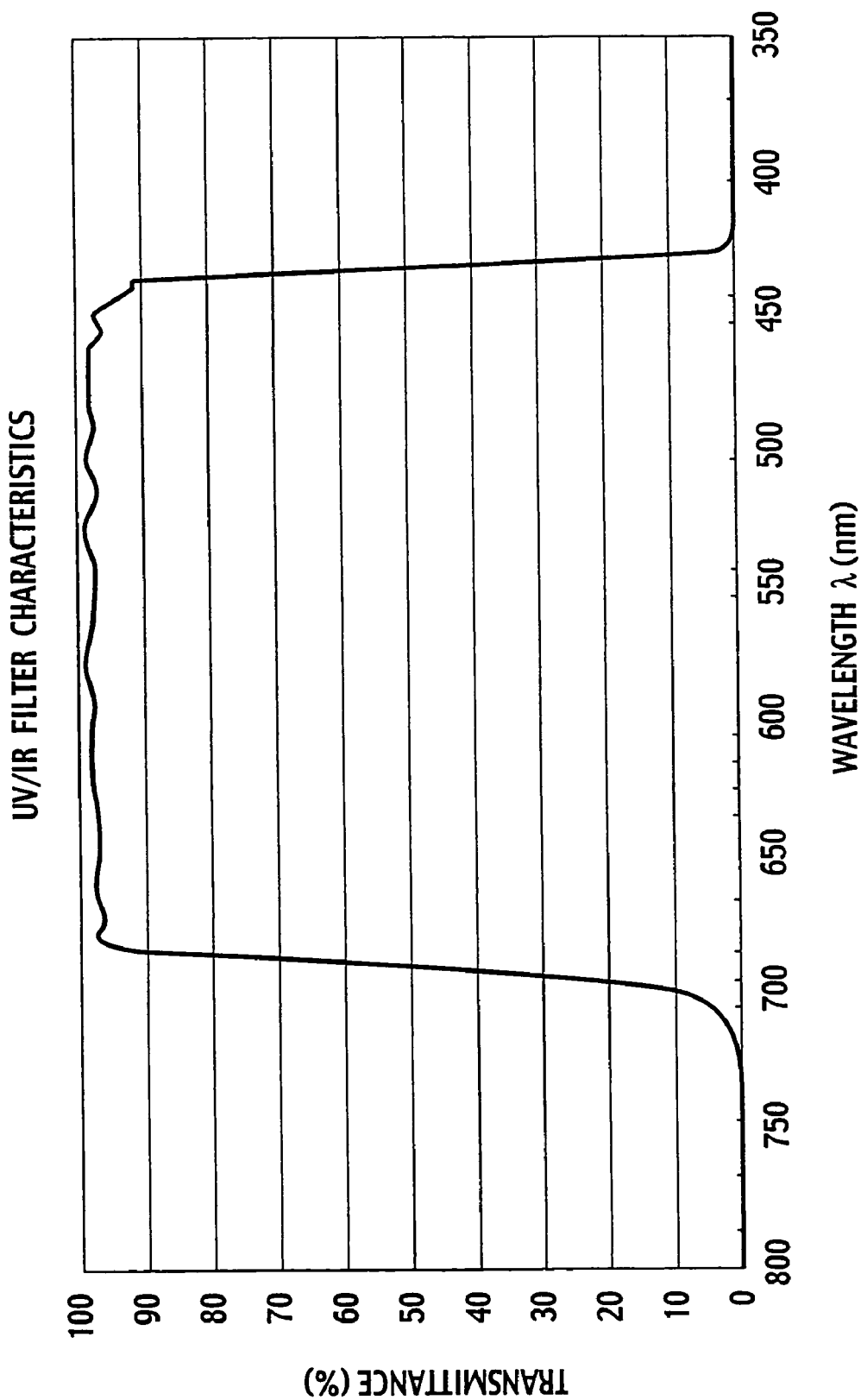
FIG. 12 is a graph illustrating an optical characteristics of an ultraviolet and infrared reflection filter used in the light display apparatus.

FIG. 12 illustrates an ultraviolet and infrared reflection filter characteristics.

In this image display apparatus, the illumination light emitted from the concave-shaped reflector 14 and transmitted through a transparent glass plate 11 is incident upon the integrator optical system 2 after passing through an ultraviolet and infrared reflection filter (a UV/IR cut filter) 22.

The UV/IR cut filter 22 is a filter that has an ultraviolet (UV) reflecting film formed on one surface thereof and an infrared (IR) reflecting film formed on the other surface thereof. As shown in FIG. 12, the UV/IR cut filter 22 has a blocking characteristics in which light having a wavelength of about 680 nm or longer and light having a wavelength of about 430 nm or shorter are cut off by reflecting ultraviolet light with the UV reflecting film and infrared light with the IR reflecting film.

In this image display apparatus, the UV/IR cut filter 22 is disposed in a way that the surface with the IR reflecting film formed on faces toward the light emitting tube.

In this image display apparatus, infrared light having a wavelength of about 680 nm or longer included in the light emitted from the light emitting tube 8 is reflected by the IR reflecting film to return toward the light emitting tube.

In addition, ultraviolet light having a wavelength of 430 nm or shorter included in the light emitted from the light emitting tube 8 passes through the IR reflecting film and a glass base material and then is reflected by the UV reflecting film. Then, the ultraviolet light reflected by the UV reflecting film in such a way passes through the glass base material and the IR reflecting film and thus returns toward the light emitting tube 8.

Since the ultraviolet light passes twice through the glass base material of the UV/IR cut filter 22, the ultraviolet light is absorbed by the base material and thereby an amount of the UV light decreases. Therefore, the ultraviolet light that returns toward the light emitting tube 8 in such a way does not have a great influence of increasing the temperature in the sealing portion of the light emitting tube 8.

On the other hand, because only a slight portion of the infrared light is absorbed by the glass base material, a large amount of both the ultraviolet and the infrared light returns toward the light emitting tube 8 and thereby the temperature of the sealing portion or the like is increased, when the UV/IR cut filter 22 is disposed so that the surface having the UV reflecting film faces toward the light emitting tube 8.

According to measurement results, the temperature of the sealing portion is confirmed to be 10 degrees Celsius higher when the UV/IR cut filter 22 is disposed in a way that the surface having the UV reflecting film faces toward the light emitting tube 8 than when the UV/IR cut filter 22 is disposed in a way that the surface having the IR reflecting film faces toward the light emitting tube 8.

By the way, although the glass base material of the UV/IR cut filter 22 increases its temperature by absorbing the ultraviolet light, the UV/IR cut filter 22 is cooled by the third cooling air 17 in this image display apparatus, thereby preventing the filter 22 from becoming excessively hot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source apparatus comprising:
    a light emitting tube having a first electrode in a first end thereof and a second electrode in a second end thereof,
    a concave-shaped reflector having a bore in a vertex portion thereof, the bore supporting said light emitting tube so that the first end is inserted therethrough and the second end is directed toward a front opening portion of said concave-shaped reflector,
    a transparent glass plate covering the front opening portion of said concave-shaped reflector,
    a lead wire of which one end connects to said second electrode and of which the other end extends out through a hole formed on a curved slope or a side surface of said concave-shaped reflector,
    a cooling fan blowing cooling air toward a side portion of said concave-shaped reflector, and
    an air guiding member that separates the cooling air originating from said cooling fan into a first, a second, and a third cooling air, the first cooling air cooling an outer surface of said concave-shaped reflector, the second cooling air cooling the other end of said lead wire extending out from said concave-shaped reflector, and the third cooling air cooling said transparent glass plate, the light source apparatus further comprising:

an ultraviolet and infrared reflection filter upon which light is incident, the light having been reflected by said concave-shaped reflector and passing through said transparent glass plate, wherein said reflection filter has an infrared reflecting film on one surface thereof and an ultraviolet reflecting film on the other surface thereof, and wherein said reflection filter is disposed so that the surface having the infrared reflecting film thereon faces toward said transparent glass plate.

2. An image display device comprising:

a light source apparatus comprising: a light emitting tube having a first electrode in a first end thereof and a second electrode in a second end thereof; a concave-shaped reflector having a bore in a vertex portion thereof, the bore supporting said light emitting tube so that the first end is inserted therethrough and the second end is directed toward a front opening portion of said concave-shaped reflector; a transparent glass plate covering the front opening portion of said concave-shaped reflector; a lead wire of which one end connects to said second electrode and of which the other end extends out through a hole formed on a curved slope or a side surface of said concave-shaped reflector; a cooling fan blowing cooling air toward a side portion of said concave-shaped reflector; and an air guiding member that separates the cooling air originating from said cooling fan into a first, a second, and a third cooling air, the first cooling air cooling an outer surface of said concave-shaped reflector, the second cooling air cooling the other end of said lead wire extending out from said concave-shaped reflector, and the third cooling air cooling said transparent glass plate, the light source apparatus further comprising: an ultraviolet and infrared reflection filter upon which light is incident, the light having been reflected by said concave-shaped reflector and passing through said transparent glass plate, and a spatial light modulator device adopted to modulate light illuminated thereon, and an imaging optics adopted to guide the light modulated by said spatial light modulator device so as to focus into an image, wherein said reflection filter has an infrared reflecting film on one surface thereof and an ultraviolet reflecting film on the other surface thereof, and wherein said reflection filter is disposed so that the surface having the infrared reflecting film thereon faces toward said transparent glass plate.

* * * * *